US011173601B2

(12) United States Patent
Satou

(10) Patent No.: US 11,173,601 B2
(45) Date of Patent: Nov. 16, 2021

(54) TEACHING DEVICE FOR PERFORMING ROBOT TEACHING OPERATIONS AND TEACHING METHOD

(71) Applicant: FANUC CORPORATION, Yamanashi (JP)

(72) Inventor: Takashi Satou, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 364 days.

(21) Appl. No.: 16/177,432

(22) Filed: Nov. 1, 2018

(65) Prior Publication Data

US 2019/0160662 A1 May 30, 2019

(30) Foreign Application Priority Data

Nov. 24, 2017 (JP) .............................. JP2017-226087

(51) Int. Cl.
*G06F 19/00* (2018.01)
*B25J 9/16* (2006.01)
*G05B 19/423* (2006.01)

(52) U.S. Cl.
CPC ............. *B25J 9/163* (2013.01); *B25J 9/1653* (2013.01); *B25J 9/1664* (2013.01); *G05B 19/423* (2013.01); *G05B 2219/34339* (2013.01); *G05B 2219/35471* (2013.01); *G05B 2219/36041* (2013.01); *G05B 2219/39427* (2013.01)

(58) Field of Classification Search
CPC ........ B25J 9/163; B25J 9/1664; B25J 9/1653; G05B 19/423; G05B 2219/34339; G05B 2219/36041; G05B 2219/35471; G05B 2219/39427
See application file for complete search history.

(56) References Cited

U.S. PATENT DOCUMENTS

| | | | | |
|---|---|---|---|---|
| 5,053,976 A | * | 10/1991 | Nose | G05B 19/427 700/251 |
| 2005/0251290 A1 | | 11/2005 | Skourup et al. | |
| 2009/0299526 A1 | | 12/2009 | Ditscher et al. | |
| 2013/0116828 A1 | * | 5/2013 | Krause | G05B 19/409 700/264 |
| 2015/0314438 A1 | * | 11/2015 | Namba | G05B 19/0426 700/257 |

(Continued)

FOREIGN PATENT DOCUMENTS

| | | |
|---|---|---|
| JP | S60-91409 A | 5/1985 |
| JP | S61-262809 A | 11/1986 |

(Continued)

*Primary Examiner* — Harry Y Oh
*Assistant Examiner* — Sohana Tanju Khayer
(74) *Attorney, Agent, or Firm* — Hauptman Ham, LLP

(57) ABSTRACT

A teaching device for performing teaching operations of a robot includes a selection unit which, during a teaching operation or after a teaching operation of the robot, moves among a plurality of lines of a program of the robot and selects a single line, an error calculation unit which calculates, after the robot has been moved by hand-guiding or jog-feeding to a teaching point which has already been taught in the selected single line, a position error between the teaching point and a position of the robot after movement, and an instruction unit which instructs to re-teach the teaching point when the position error is within a predetermined range.

6 Claims, 8 Drawing Sheets

(56) References Cited

U.S. PATENT DOCUMENTS

| | | | | |
|---|---|---|---|---|
| 2016/0008983 A1* | 1/2016 | Osaka | ................... | B25J 9/1628 |
| | | | | 700/254 |
| 2016/0055677 A1* | 2/2016 | Kuffner | .................. | G06F 1/163 |
| | | | | 345/633 |
| 2016/0271792 A1* | 9/2016 | Yui | ...................... | G05B 19/409 |
| 2016/0332297 A1* | 11/2016 | Sugaya | ............... | G06F 3/04842 |
| 2017/0371314 A1* | 12/2017 | Krause | .................. | G05B 19/27 |
| 2018/0250814 A1* | 9/2018 | Hashimoto | ............. | B23P 19/04 |

FOREIGN PATENT DOCUMENTS

| | | |
|---|---|---|
| JP | H1-106110 A | 4/1989 |
| JP | H5-301182 A | 11/1993 |
| JP | H6-270082 A | 9/1994 |
| JP | H8-194518 A | 7/1996 |
| JP | H11-262882 A | 9/1999 |
| JP | 2000-288432 A | 10/2000 |
| JP | 2004-302507 A | 10/2004 |
| JP | 2004-334710 A | 11/2004 |
| JP | 2007249267 A | 9/2007 |
| JP | 2009269155 A | 11/2009 |
| JP | 2010-182210 A | 8/2010 |
| JP | 2012-22546 A | 2/2012 |
| JP | 2012106321 A | 6/2012 |
| JP | 201399815 A | 5/2013 |
| JP | 2013-545624 A | 12/2013 |
| WO | 2005/045541 A1 | 5/2005 |

* cited by examiner

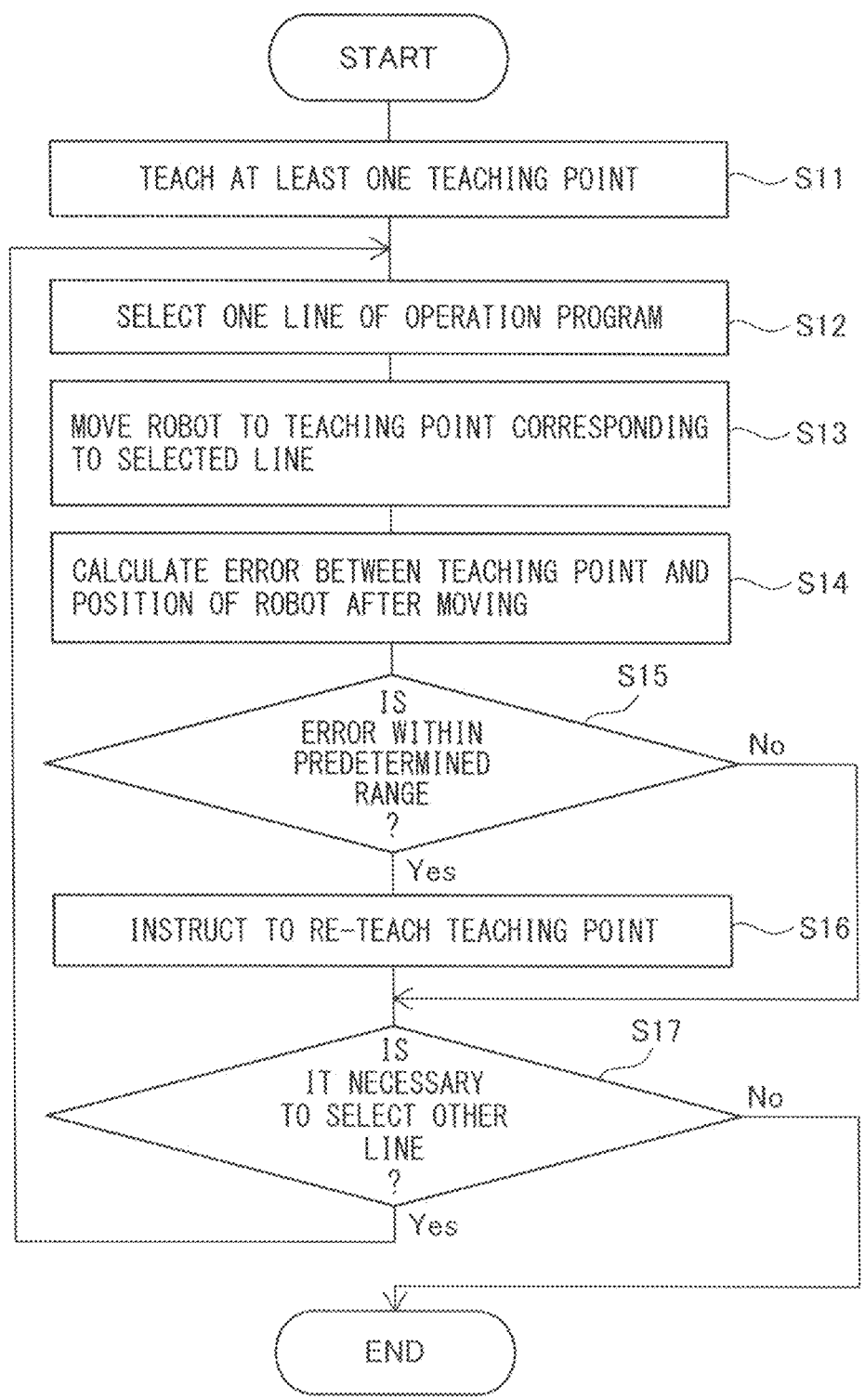

TEACHING DEVICE FOR PERFORMING ROBOT TEACHING OPERATIONS AND TEACHING METHOD

RELATED APPLICATIONS

The present application claims priority of Japanese Patent Application No. 2017-226087, filed on Nov. 24, 2017, the disclosure of which is hereby incorporated by reference herein in its entirety.

BACKGROUND OF THE INVENTION

1. Technical Field

The present invention relates to a teaching device for performing the teaching operations of a robot and a teaching method.

2. Description of Related Art

When teaching a robot, in some cases a human applies a force to a handle or joystick attached to the robot or to the body of the robot to move the robot in the direction of the force and to move the robot to the desired position. Such a method of guiding a robot in this manner is referred to as hand-guiding, direct teaching, lead-through, or the like.

In some cases, a force sensor is incorporated in the handle or a torque sensor is incorporated in the motor of each axis of the robot in order to detect the direction of the force. The operator moves the robot to the desired position by such a hand-guiding function, and teaches the position to the robot. Thereafter, such operation is repeated to teach the robot trajectory. Refer to, for example, Japanese Unexamined PCT Publication (Kohyo) No. 2013-545624.

SUMMARY OF THE INVENTION

In the positions at which the robot contacts with/is spaced from the workpiece, it is necessary to set the position and orientation of the robot especially precisely. Further, if the fixed position of the workpiece is changed or if there are individual differences in shape of workpieces, it is necessary to re-correct such already set teaching points. In contrast, when teaching passing points, at which the robot simply moves through the position away from workpiece, as teaching points, there is little need to change such teaching points.

It is difficult for the operator to distinguish between a teaching point requiring correction and a teaching point requiring no correction. For this reason, the operator partially reproduces the program for a single teaching point, moves the robot, determines whether or not correction is necessary, and corrects the single teaching point if correction is necessary. However, since robot programs contain a large number of teaching points, it is necessary to repeat such operations for all of the teaching points, which is extremely complicated.

Thus, a teaching device in which it can be easily determined whether or not it is necessary to correct an already set teaching point is desired.

According to a first aspect of the present disclosure, provided is a teaching device for performing teaching operations of a robot, which performs operations on a workpiece, comprising a selection unit which, during a teaching operation or after a teaching operation of the robot, moves among a plurality of lines of a program of the robot and selects a single line, an error calculation unit which calculates, after the robot has been moved by hand-guiding or jog-feeding to a teaching point which has already been taught in the selected single line, at least one of a position error between the teaching point and a position of the robot after movement and an orientation error between an orientation of the tool of the robot at the teaching point and the orientation of the tool of the robot after movement, and an instruction unit which instructs to re-teach the teaching point when at least one of the position error and the orientation error is within a respective predetermined range.

In the first aspect, when the position error (distance) or the orientation error between an already taught teaching point and the position of the robot which has been moved to the teaching point by hand-guiding or the like is within a respective predetermined range, an instruction to re-teach the teaching point is issued. When the robot is some distance from the teaching point, namely, when the position error is within the predetermined range and the position error is greater than the minimum value of the predetermined range, an instruction to re-teach the teaching point is issued. Thus, the operator can easily determine whether or not it is necessary to correct a teaching point which has been already set. The minimum value of the predetermined range of the position error is on the order of, for example, a few millimeters to 10 millimeters. Note that, when the position error is greater than the maximum value of the predetermined range, since there is a risk that a position unrelated to the teaching point may be re-taught, an instruction to re-teach is not issued in this case.

The objects, features and advantages of the present invention will be more apparent from the following description of embodiments with reference to the accompanying drawings.

BRIEF DESCRIPTION OF THE DRAWINGS

FIG. 2 is a flowchart showing the operations of the teaching system shown in FIG. 1.

DETAILED DESCRIPTION

Figure 1:
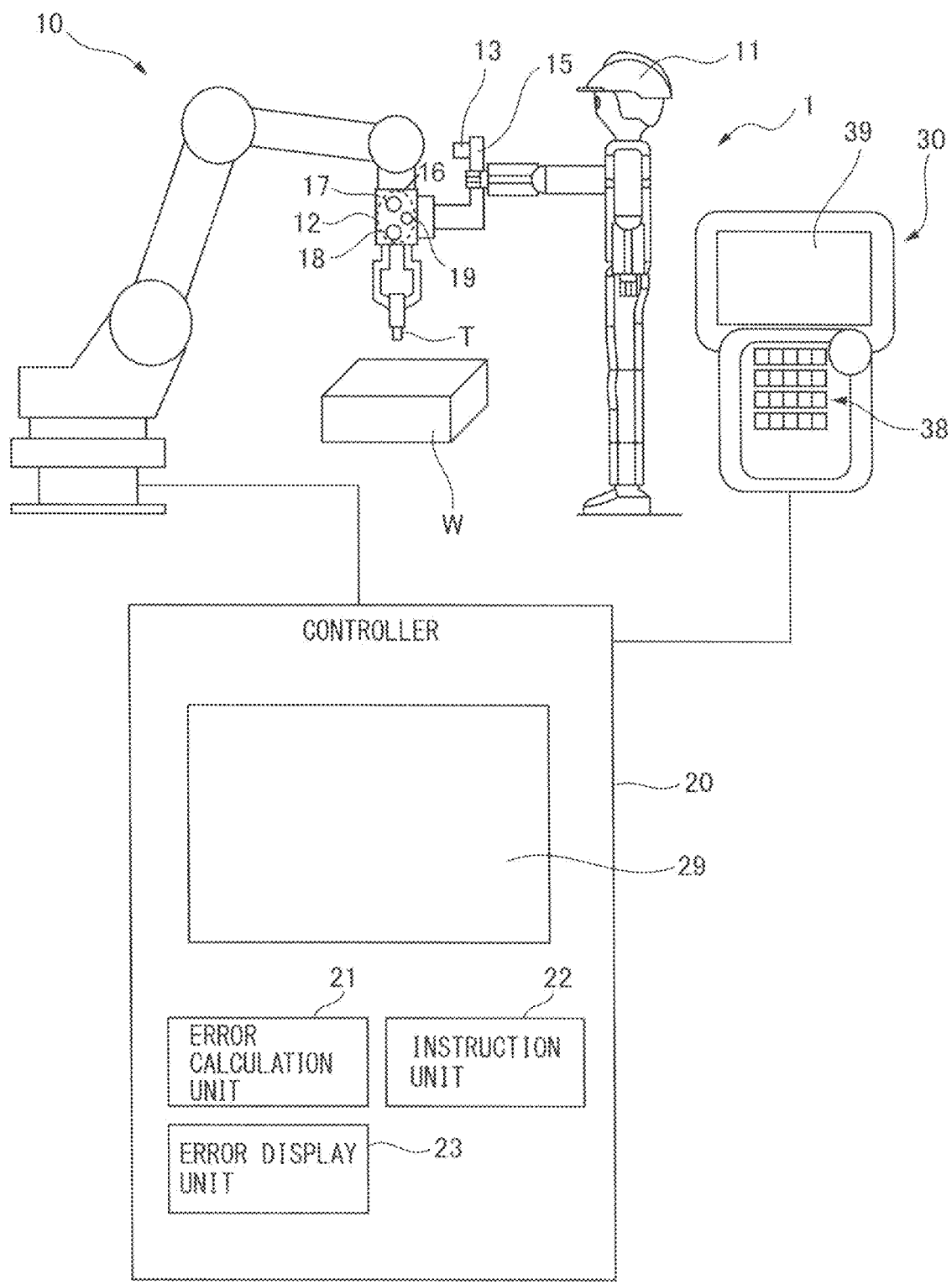
FIG. 1 is a conceptual diagram of a teaching system according to a first embodiment.

The embodiments of the present invention will be described below with reference to the attached drawings. In the drawings, corresponding components have been assigned the same reference numerals.

FIG. 1 is a conceptual view of a teaching system according to a first embodiment. The teaching system 1 of the first embodiment mainly comprises a robot 10, a controller 20 for controlling the robot 10, and a teach pendant 30 connected to the controller 20. In the first embodiment, the controller 20 and the teach pendant 30 serve as the teaching device.

The robot 10 is an articulated robot and has a plurality of, for example, six, axes. The robot 10 may be a robot that shares a workspace with a human 11 and which performs collaborative operations. The robot 10 includes a tool T at the tip of the robot 10 via an adapter 12 and a tool changer. The tool T may be directly attached to the adapter 12. The type of the tool T differs in accordance with the welding, deburring, polishing, assembly, etc., of the workpiece W. A handle 15 to be gripped when an operator, for example, the human 11, performs a hand-guiding operation, is attached to the adapter 12.

Further, a hand-guiding switch 13 is provided on the handle 15. An operator, for example, the human 11, grips the handle 15 and depresses the hand-guiding switch 13 when performing a hand-guiding operation. Hand-guiding operations can be performed while the hand-guiding switch 13 is depressed. Furthermore, when the hand-guiding switch 13 is not depressed, hand-guiding operations cannot be performed.

The teach pendant 30 is used for the teaching operation, etc., of the robot 10 and performs the jog-feeding, etc., of each axis of the robot 10 in accordance with the operations of the operator. The teach pendant 30 includes a plurality of keys 38 used for operations such as jog-feeding and a screen 39 as a display unit. A plurality of lines of the operation program for teaching the robot 10 are displayed on the screen 39. Furthermore, in place of the teach pendant 30, a tablet (not shown) having the same function as the teach pendant 30 may be used for the teaching operations.

Two selection buttons 17, 18 are provided on the adapter 12 of the robot 10. The operator depresses one of the selection buttons 17, 18 during the teaching operation or after the teaching operation of the robot 10 while referring to the operation program of the robot 10 displayed on the screen 39. For example, when the selection button 17 is depressed, the operation program scrolls upward and when the selection button 18 is depressed, the operation program scrolls downward. When the depression of the selection buttons 17, 18 is released, scrolling of the operation program ends and the line of the operation program currently selected is indicated on the screen 39 by a cursor or the like. Alternatively, the desired line of the operation program may be selected by depressing a determination button 19. The selection buttons 17, 18 or the selection buttons 17, 18 and the determination button 19 serve as a selection unit 16 for moving between the plurality of lines of the operation program of the robot 10 and selecting a single line from thereamong.

Note that the selection buttons 17, 18, etc., as the selection unit 16 need not necessarily be provided on the adapter 12. Rather, for example, predetermined keys 38 of the teach pendant 30 may function as the selection buttons 17, 18, etc. Furthermore, the screen 39 of the teach pendant 30 or the touch panel of the tablet, which is not illustrated, may be used as the selection unit 16.

The controller 20 is a digital computer including a CPU and memory connected to each other via busses, and includes a screen 29 as a display unit. The screen 29 can be used appropriately in place of the screen 39 of the teach pendant 30.

The controller 20 includes an error calculation unit 21 which calculates, after the robot 10 has been moved by hand-guiding or jog-feeding to the teaching point which has already been taught in the single line selected by the selection unit 16, a position error L (distance) between the teaching point and the position of the robot after movement and an instruction unit 22 which instructs to re-teach the teaching point when the position error L is within a predetermined range. Further, the controller 20 may include an error display unit 23 which displays the position error L.

The instruction unit 22 and the error display unit 23 may display the position error L and a message instructing the human 11 to re-teach on the screens 29, 39, respectively. The instruction unit 22 and the error display unit 23 may output a sound instructing the human 11 to re-teach and a sound indicating the position error L, respectively.

FIG. 2 is a flowchart showing the processing of the teaching system shown in FIG. 1. First, in step S11, the human 11 (operator) teaches the robot 10 at least one teaching point by hand-guiding or jog-feeding in a predetermined manner.

Figure 3A:
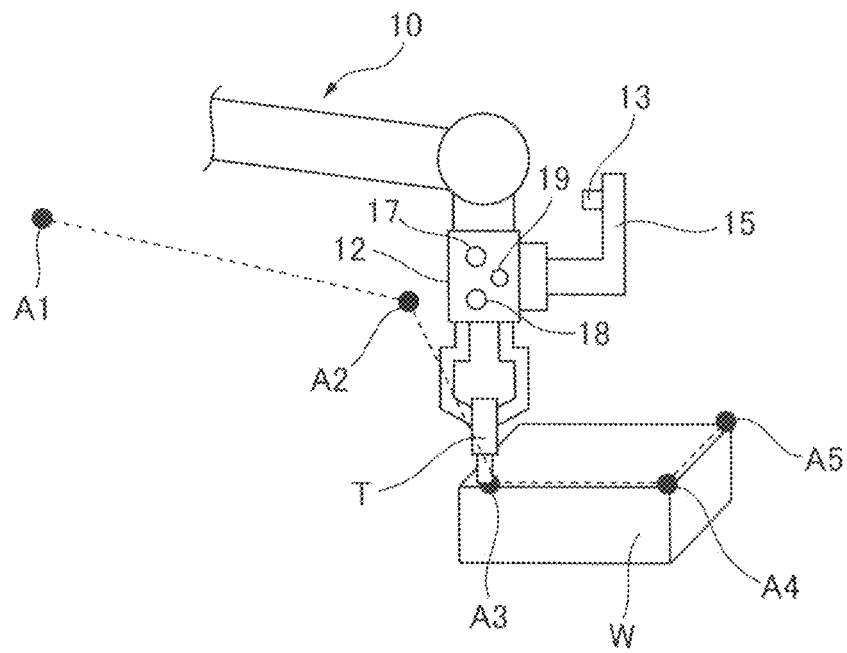
FIG. 3A is a first partially enlarged view of a robot.

FIG. 3A is a first partially enlarged view of the robot. In FIG. 3A, which is an example, five teaching points A1 to A5 are shown. Teaching point A1 is the operation start position of the robot 10 and teaching point A2 is a passing position. Teaching points A3 to A5 are the vertex positions of the box-type workpiece W. After teaching the teaching point A1 as the operation start position, the human 11 teaches the teaching point A2 by moving the tool T of the robot 10 by hand-guiding or the like. The teaching point A3 is taught by moving the tool T of robot 10 to one vertex of workpiece W in the same manner. Next, teaching points A4 and A5 are taught by moving the tool T along the edges of workpiece W.

During teaching, the plurality of lines of the operation program of the robot 10 are displayed on the screen 39 of the teach pendant 30. Each time a single teaching point is taught, the teaching position and teaching orientation are automatically entered and stored numerically in the corresponding line of the operation program. Note that, for the purpose of facilitating understanding, illustration of human 11 has been omitted from FIG. 3A and the like.

After the single teaching point or all of the teaching points of the robot 10 have been taught, in step S12, the human 11 (operator) uses the selection buttons 17, 18 to scroll the operation program in a desired direction on the screen 39. Further, the human 11 selects a desired line of the operation program by releasing the depression of the selection buttons 17, 18 or by depressing the determination button 19. This operation is advantageous when human 11 notices that there has been a teaching mistake during the teaching operation.

Then, in step S13, the human 11 moves the robot 10 by hand-guiding or jog-feeding to or near the teaching point being taught which is described in the selected line. Note that when the teaching point is not described in the selected line, it is not necessary to perform the operations after step S13.

Figure 3B:
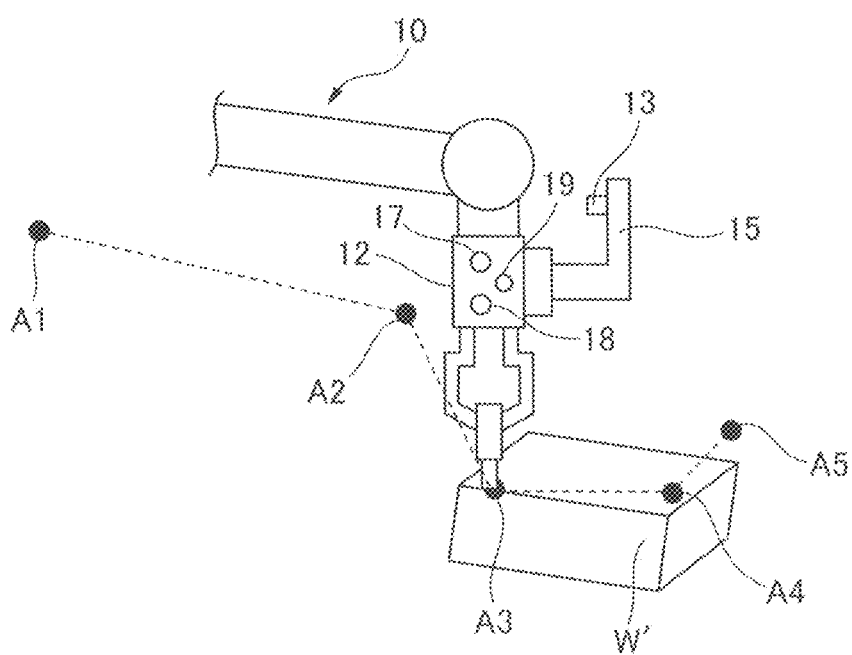
FIG. 3B is a second partially enlarged view of the robot.

Depending on the type of machining operation of the workpiece, the workpiece W may be replaced with another similar workpiece during the teaching operation or after the teaching operation. In FIG. 3B, which is similar to FIG. 3A, for example, another workpiece W' arranged at a slightly different position than workpiece W is shown. In this case, the other workpiece W' has a positioning error with respect to workpiece W. Thus, there is a risk that the machining operation of workpiece W' performed along the teaching points A3 to A5 is not satisfactory.

Further, if the machining operation of workpiece is, for example, a deburring operation for removing burrs formed along the edge of workpiece W, the dimensions of workpiece themselves may change or the dimensions of the burrs formed on the workpieces may be different between the different workpieces W, W'. As a result, a situation arises in which the positions of the edges of the other workpiece W' are different from the positions of the edges of the workpiece W. In such a case, if the teaching points taught for the workpiece W are used for the other workpiece W', the burrs of the other workpiece W' may not be satisfactorily removed. A similar problem may arise when the robot 10 performs operations other than deburring.

Figure 3C:
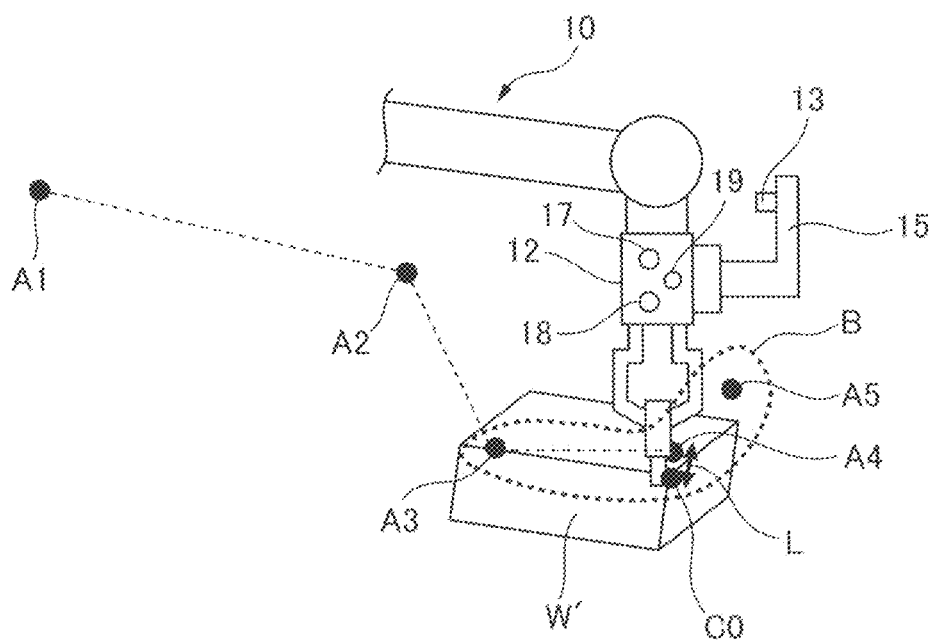
FIG. 3C is a third partially enlarged view of the robot.

However, it is difficult for the human 11 to determine whether the position error or shape error (dimensional differences of the workpieces W, W' themselves, dimensional differences of the burrs) between the workpiece W and the other workpiece W' is within an allowable range by merely viewing the workpiece W and the other workpiece W'. Thus, in step S14, the error calculation unit 21 calculates the position error L between the taught teaching point and the current position of the tool T of robot 10. In FIG. 3C, which is similar to FIG. 3A, the position error L between the teaching point A4 and the current position CO of the robot 10 is shown. Note that the current position CO of the robot 10 can be obtained from a position sensor (not shown) or can be obtained from the rotation angle of the motor of each axis of the robot 10.

In step S15, it is determined whether or not this position error L is within the predetermined range. The predetermined range is obtained in advance from experimentation, etc. and includes a minimum value and a maximum value. When the position error L is within the predetermined range, it can be determined that the tool T of the robot 10 is spaced from the teaching point by more than the minimum value. The minimum value is on the order of, for example, a few millimeters to 10 millimeters. In this case, proceeding to step S16, the instruction unit 22 displays, on the screen 39 or the screen 29, a message instructing the human 11 to re-teach the teaching point used to calculate the position error L, in this case, the teaching point A4. Alternatively, the instruction unit 22 may output a sound instructing the human 11 to re-teach the teaching point.

Due to the foregoing, human 11 can easily determine whether or not it is necessary to correct the already set teaching point. Thus, human 11 can re-teach the teaching point used to calculate the position error L, in this case, the teaching point A4. At this time, the teaching point A4, which has already been taught, may be temporarily deleted. Note that if the position error L is greater than the maximum value of the predetermined range, the instruction unit 22 does not issue an instruction to re-teach, because a position unrelated to the teaching point A4, which has already been taught, may be re-taught.

Then, in step S17, it is determined whether or not it is necessary to select another line of the operation program. In the example shown in FIG. 3C, a plurality of teaching points A3 to A5 corresponding to respective vertexes of the workpiece W are included in the region B. In other words, in step S17, it is determined whether or not there is another teaching point at which the tool T actually contacts, etc., the workpiece W or the workpiece W'. Specifically, this is determined by determining whether or not an instruction for the tool T to perform an operation at each of a plurality of taught teaching points is described in the operation program.

If such a line or teaching point exists, the process returns to step S12. Thereafter, a line of operation program including another teaching point, e.g., teaching point A5, is selected and the same process is repeated. If such a line or teaching point does not exist, the process ends.

Thus, in the present disclosure, an instruction to re-teach is issued if the distance between a taught teaching point and the position of the robot moved to the teaching point by hand-guiding, etc., is within the predetermined range. For this reason, the operator can easily determine whether or not it is necessary to correct the already set teaching point. The error display unit 23 may display the position error on the screen 29 or the screen 39. In this case, the operator can more easily determine whether or not it is necessary to correct the teaching point.

Figure 4:
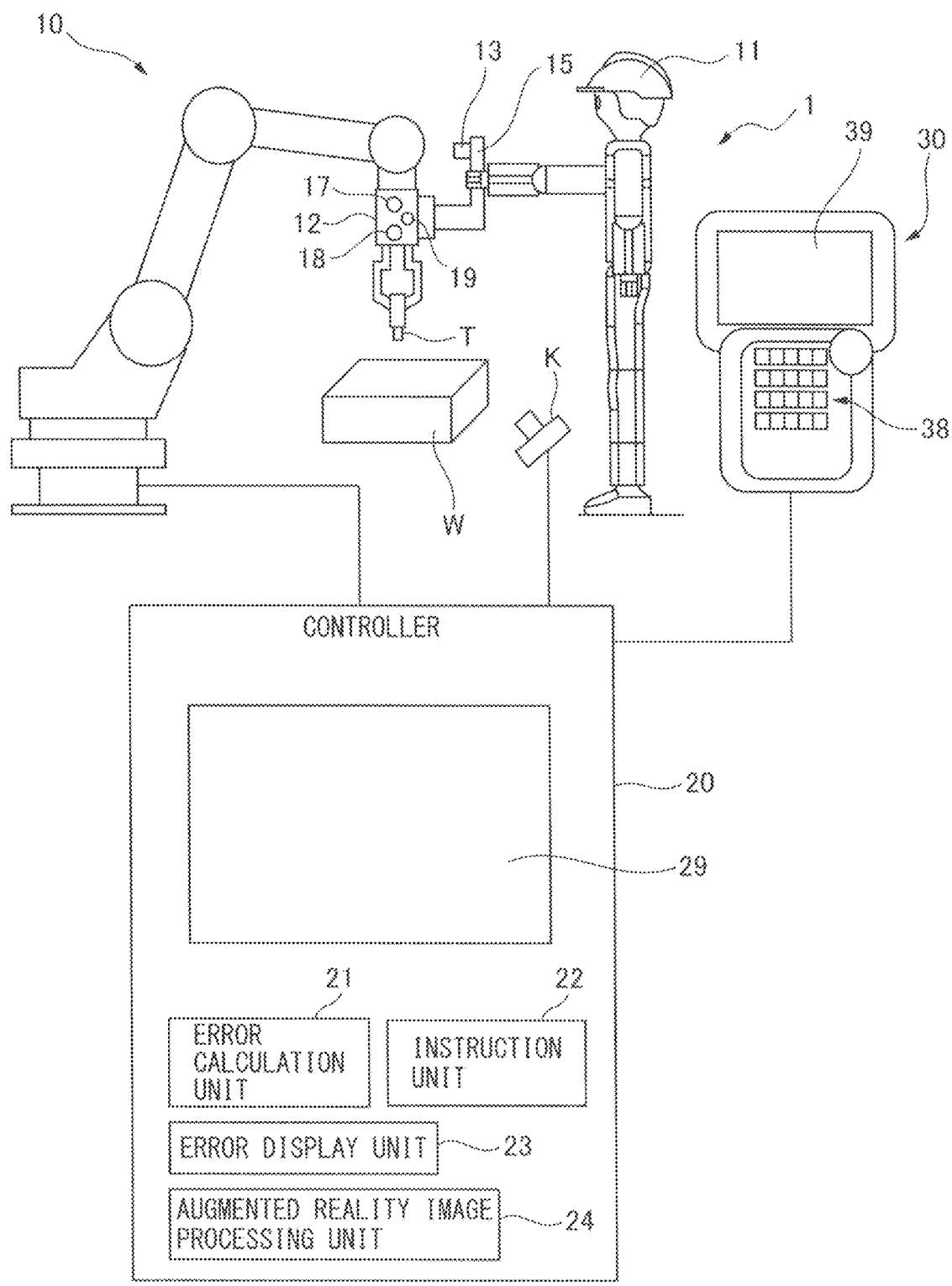
FIG. 4 is a conceptual diagram of a teaching system according to a second embodiment.

FIG. 4 is a conceptual diagram of a teaching system according to a second embodiment. In the second embodiment, an image capture unit K, for example, a camera, is connected to the controller 20. The image capture unit K captures a real image of the robot 10, in particular, a real space including the tool T and workpiece W. The real image of real space including the robot 10 and the workpiece W captured by the image capture unit K is displayed on the screen 29 or the screen 39 as a display unit. Furthermore, the controller 20 also includes an augmented reality image processing unit 24 which superimposes information indicating the positions of the teaching points which have already been taught onto the real image and displays the same on the screen 29, 39.

In the second embodiment, a process similar to that described with reference to FIG. 2 is performed. In the second embodiment, the image capture unit K continuously captures real images of the robot 10, in particular, the tool T and the workpiece W, during the teaching operation. In response to a request from the human 11, the real image is displayed on the screen 29 or the screen 39. Further, each time the human 11 teaches a teaching point, the augmented reality image processing unit 24 superimposes the information indicating the position of the taught teaching point onto the real image and displays the same on the screen 29 or the screen 39.

Figure 5:
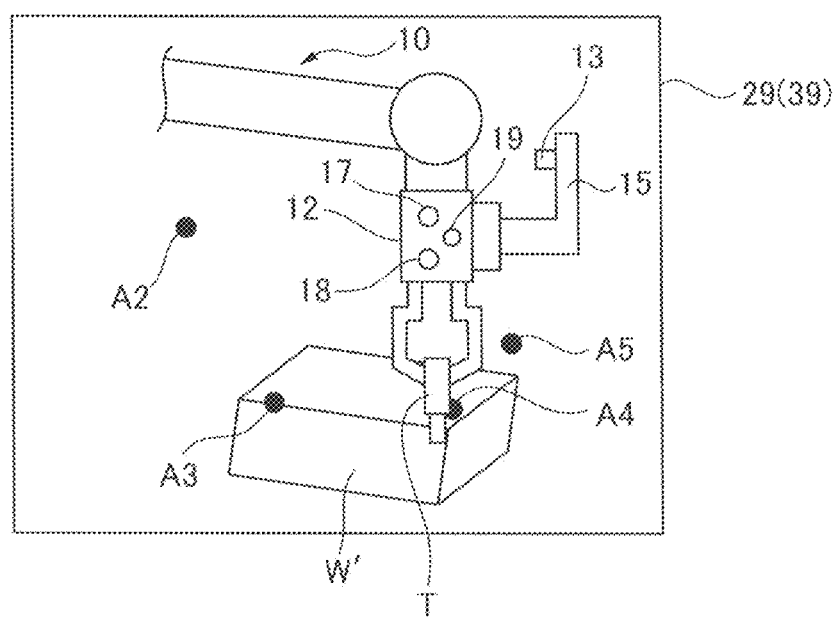
FIG. 5 is an enlarged view of a screen.

FIG. 5 is an enlarged view of a screen. In FIG. 5, information indicating the positions of the teaching points A2 to A5, which have already been taught, is displayed in a superimposed manner on the real image of the robot 10 as black circles. In this case, it is necessary to convert the positions of the teaching points from the coordinate system of the robot to the coordinate system of the camera using a position and orientation measuring device or an AR marker. The other workpiece W' is included in the real image of FIG. 5. Thus, the human 11 can easily recognize the position error between the vertexes of the other workpiece W' and the teaching points A3 to A5 through the screen 29, 39. Thus, it is very easy to determine whether or not it is necessary to correct the already set teaching points.

Figure 6A:
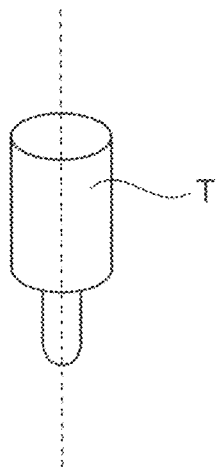
FIG. 6A is a first view showing an orientation of a tool.
Figure 6B:
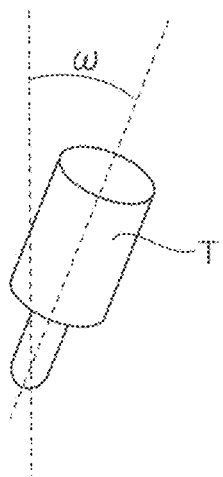
FIG. 6B is a second view showing the orientation of the tool.

Further, FIGS. 6A and 6B show orientations of the tool T. The tool shown in FIG. 6A is arranged in the vertical direction, and in this orientation, the tool T can satisfactorily machine the workpiece W. The tool T shown in FIG. 6B is arranged in the oblique direction, and there is an error ω in the angle between the tool T and the vertical direction. In the orientation shown in FIG. 6B, a portion other than the tip of the tool T may contact the workpiece W. For this reason, in the orientation shown in FIG. 6B, the tool T cannot satisfactorily machine the workpiece W. Note that the orientation of the tool T in which the workpiece W can be satisfactorily machined may be another orientation.

The orientation of the tool T when the teaching point is taught in step S11 of FIG. 2 is stored in the storage unit of the controller 20. In another unillustrated embodiment, in step S14, the error calculation unit 21 may calculate the orientation error ω between the stored orientation of the tool T and the current orientation of the tool T of the robot. In such a case, in step S15, the calculated orientation error ω is compared with a predetermined range for the orientation error. If the orientation error ω is within the predetermined range, an instruction to re-teach the teaching point is issued in the same manner. Both position error and orientation error may be calculated and compared. In such a case, it is possible to reliably determine whether or not it is necessary to re-teach the teaching point. Further, in order to display the orientation error ω, the augmented reality image processing unit 24 may superimpose a model of the tool T having the orientation when teaching the teaching point onto the real image on the screen 29 or the screen 39.

Figure 7:
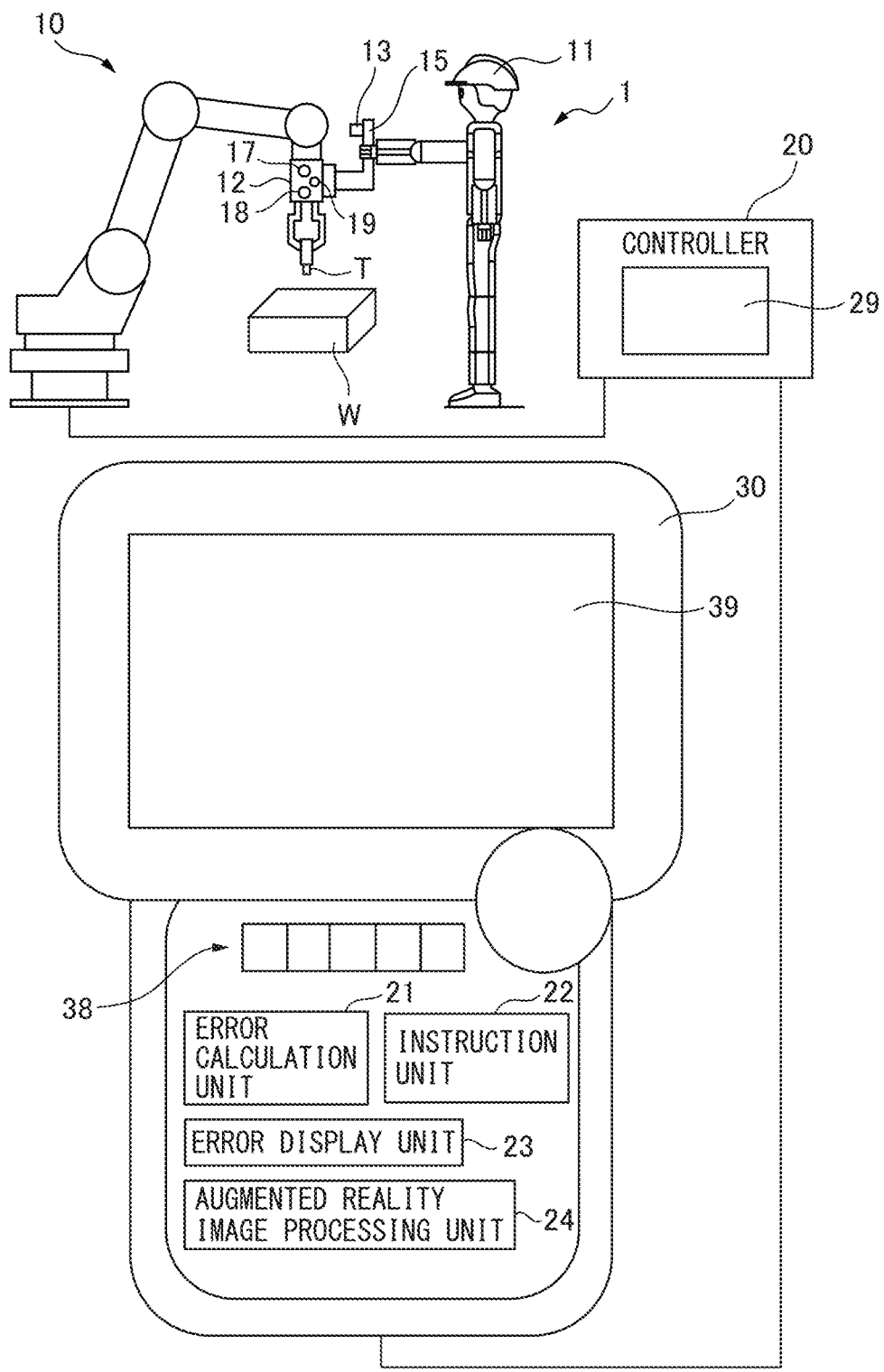
FIG. 7 is a conceptual diagram of a teaching system according to a third embodiment.

Further, FIG. 7 is a conceptual diagram of a teaching system according to a third embodiment. In the third embodiment, the teach pendant 30 includes the error calculation unit 21, the instruction unit 22, the error display unit 23, the augmented reality image processing unit 24, and the like. Thus, in this case, the teach pendant 30 alone serves as the teaching device. Such a case is within the scope of the present invention. The CPU of the controller 20 and the CPU of the teach pendant 30 serve as the error calculation unit 21, the instruction unit 22, the error display unit 23 and the augmented reality image processing unit 24.

Aspects of the Disclosure

According to a first aspect, provided is a teaching device for performing teaching operations of a robot, which performs operations on a workpiece, comprising a selection unit which, during a teaching operation or after a teaching operation of the robot, moves among a plurality of lines of a program of the robot and selects a single line, an error calculation unit which calculates, after the robot has been moved by hand-guiding or jog-feeding to a teaching point which has already been taught in the selected single line, at least one of a position error between the teaching point and a position of the robot after movement and an orientation error between an orientation of the tool of the robot at the teaching point and the orientation of the tool of the robot after movement, and an instruction unit which instructs to re-teach the teaching point when at least one of the position error and the orientation error is within a respective predetermined range.

According to the second aspect, provided is the first aspect, further comprising an error display unit for displaying at least one of the position error and the orientation error.

According to the third aspect, provided is the first or second aspect, further comprising a display unit for displaying a real image of a real space including the robot and the workpiece captured by an image capture unit and an augmented reality image processing unit for superimposing information indicating the position of the teaching point on the real image and displaying on the display unit.

According to the fourth aspect, in any of the first through third aspects, the teaching point is deleted when the teaching point is re-taught.

According to the fifth aspect, provided is a teaching method for performing teaching operations of a robot which performs operations on a workpiece, comprising steps of moving, during a teaching operation or after a teaching operation of the robot, between a plurality of lines of a program of the robot and selecting a single line, calculating, after the robot has been moved by hand-guiding or jog-feeding to a teaching point which has already been taught in the selected single line, at least one of a position error between the teaching point and a position of the robot after movement and an orientation error between an orientation of the tool of the robot at the teaching point and the orientation of the tool of the robot after movement, and re-teaching the teaching point when at least one of the position error and the orientation error is within a respective predetermined range.

According to the sixth aspect, provided is the fifth aspect, further comprising a step of displaying at least one of the calculated position error and orientation error on an error display unit.

According to the seventh aspect, provided is the fifth or sixth aspect, further comprising a step of superimposing information indicating the position of the teaching point on a real image of a real space including the robot and the workpiece captured by an image capture unit and displaying on a display unit.

According to the either aspect, in any of the fifth through seventh aspects, the teaching point is deleted when the teaching point is re-taught.

Effects of the Aspects

In the first and fifth aspects, when the position error (distance) or the orientation error between the teaching point which has already been taught and the position of the robot after having been moved to the teaching point by hand-guiding or the like is within the respective predetermined range, an instruction to re-teach the teaching point is issued. Thus, the operator can easily determine whether or not it is necessary to correct the teaching point which has already been set.

In the second and sixth aspects, the operator can more easily determine whether or not it is necessary to correct the teaching points.

In the third and seventh aspects, the operator can very easily determine whether or not it is necessary to correct the teaching points which have already been set.

In the fourth and eighth aspects, a re-teaching operation can be easily performed.

Although embodiments of the present invention have been described above, it can be understood by a person skilled in the art that various modifications and changes can be made without departing from the scope of the claims set forth below.

The invention claimed is:

1. A teaching device for performing teaching operations of a robot, which performs operations on a workpiece, comprising:
   a selection unit configured to, during a teaching operation or after a teaching operation of the robot, scroll an operation program of the robot upward or downward and select a single line among a plurality of lines of the operation program,
   a processor configure to
   calculate, after the robot has been moved by hand-guiding or jog-feeding to a teaching point which has already been taught in the selected single line, at least one of (i) a position error between the teaching point and a position of the robot after movement and (ii) an orientation error between an orientation of a tool attached to the robot at the teaching point and the orientation of the tool attached to the robot after movement, and
   instruct to re-teach the teaching point in response to at least one of the position error and the orientation error being within a respective predetermined range, and
   a display configured to display a real image of a real space including the robot and the workpiece, wherein
   the processor is configured to cause the display to superimpose information indicating the position of the teaching point on the real image, and
   the processor is configured to cause the display to display on the display a model of the tool having the orientation when teaching the teaching point, the model being superimposed onto the real image.

2. The teaching device according to claim 1, wherein the display is further configured to display at least one of the position error and the orientation error.

3. The teaching device according to claim 1, wherein the teaching point is deleted when the teaching point is re-taught.

4. A teaching method for performing teaching operations of a robot which performs operations on a workpiece, the method comprising:
  scrolling, during a teaching operation or after a teaching operation of the robot, an operation program of the robot upward or downward and selecting a single line among a plurality of lines of the operation program,
  calculating, after the robot has been moved by hand-guiding or jog-feeding to a teaching point which has already been taught in the selected single line, at least one of
    a position error between the teaching point and a position of the robot after movement and
    an orientation error between an orientation of a tool attached to the robot at the teaching point and the orientation of the tool attached to the robot after movement, and
  re-teaching the teaching point in response to at least one of the position error and the orientation error being within a respective predetermined range,
  displaying, on a display, a real image of a real space including the robot and the workpiece,
  superimposing, on the display, information indicating the position of the reaching point on the real image, and
  displaying, on the display, a model of the tool having the orientation when teaching the teaching point, the model being superimposed onto the real image.

5. The teaching method according to claim 4, further comprising displaying at least one of the calculated position error and orientation error.

6. The teaching method according to claim 4, wherein the teaching point is deleted. when the teaching point is re-taught.

* * * * *